United States Patent

Mott et al.

[11] Patent Number: 5,683,319
[45] Date of Patent: Nov. 4, 1997

[54] CHAIN ASSEMBLIES WITH MINIMAL PIN PROJECTION

[75] Inventors: Philip J. Mott; David C. White, both of Dryden, N.Y.

[73] Assignee: Borg-Warner Automotive, Inc., Sterling Heights, Mich.

[21] Appl. No.: 641,682

[22] Filed: May 2, 1996

Related U.S. Application Data

[60] Division of Ser. No. 361,432, Dec. 21, 1994, Pat. No. 5,551,925, which is a continuation-in-part of Ser. No. 131,473, Oct. 4, 1993, Pat. No. 5,427,580, which is a continuation-in-part of Ser. No. 885,194, May 19, 1992, abandoned.

[51] Int. Cl.⁶ .................................................. F16H 7/00
[52] U.S. Cl. ............................................. 474/85; 474/228
[58] Field of Search ................................ 474/30, 84–89, 474/228, 229, 148, 202

[56] References Cited

U.S. PATENT DOCUMENTS

| | | | |
|---|---|---|---|
| 617,137 | 1/1899 | Anthony | 474/228 X |
| 697,190 | 4/1902 | Aultman | 474/228 |
| 1,469,001 | 9/1923 | Gentry | 474/228 X |
| 3,931,706 | 1/1976 | McKeon et al. | 59/4 |
| 4,036,072 | 7/1977 | McKeon et al. | 74/245 R |
| 4,186,617 | 2/1980 | Avramidis | 74/245 S |
| 4,342,560 | 8/1982 | Ledvina et al. | 474/157 |
| 4,642,074 | 2/1987 | Pillips | 474/156 |
| 4,758,210 | 7/1988 | Ledvina | 474/212 |
| 5,427,580 | 6/1995 | Ledvina et al. | 474/84 |
| 5,445,570 | 8/1995 | White | 474/213 |

FOREIGN PATENT DOCUMENTS

| | | |
|---|---|---|
| 3-28348 | 3/1991 | Japan . |
| 5-17251 | 3/1993 | Japan . |

*Primary Examiner*—Roger J. Schoeppel
*Attorney, Agent, or Firm*—Sidley & Austin; Greg Dziegielewski

[57] ABSTRACT

A chain assembly has pins extending through the guide links with minimal projection beyond the outside edge of the guide links. The minimal pin projection provides a chain assembly of narrow construction. Modular chain systems are also provided that permit manufacturing savings in the construction of chain systems of standard widths.

2 Claims, 8 Drawing Sheets

FIG.10A
FIG.10B
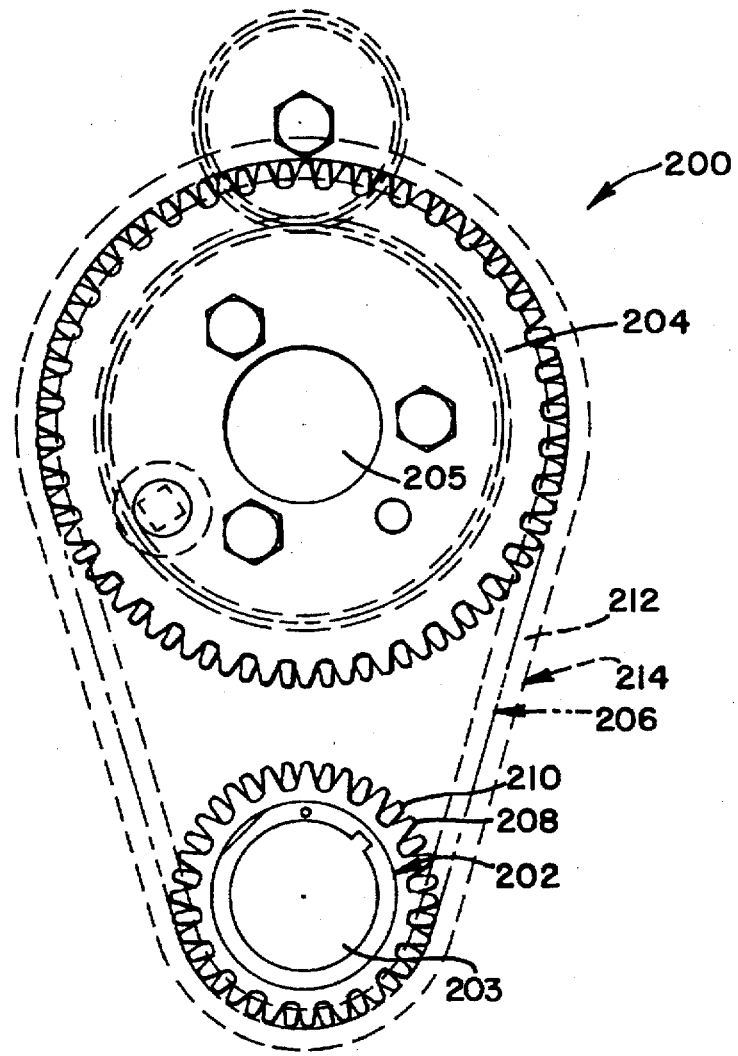
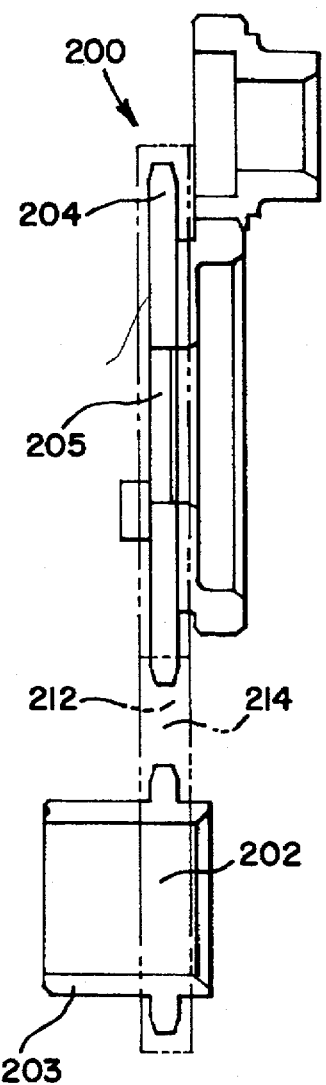

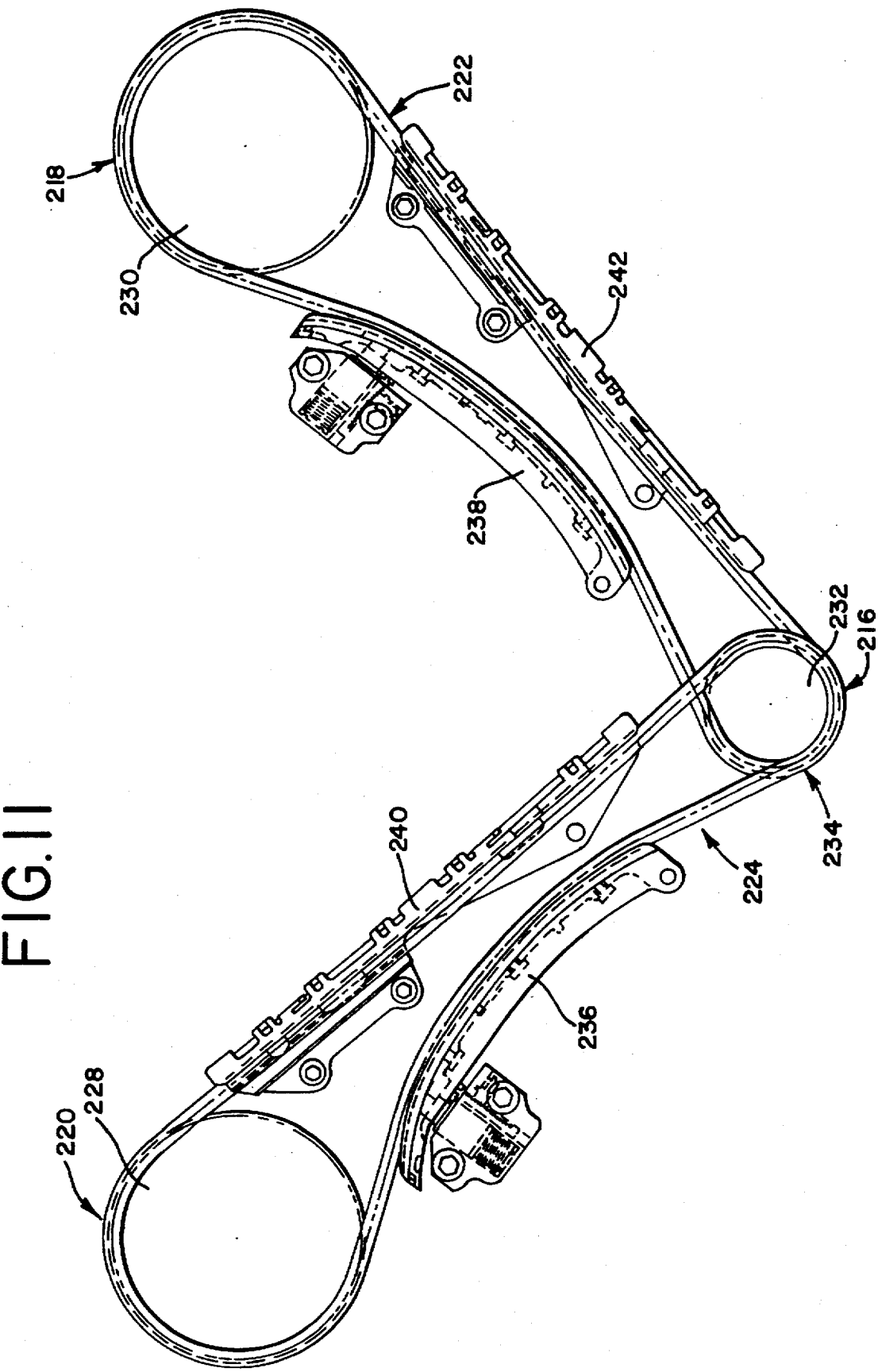

CHAIN ASSEMBLIES WITH MINIMAL PIN PROJECTION

This application is a division of application Ser. No. 08/361,432, filed Dec. 21, 1994, now U.S. Pat. No. 5,551,925, which is a continuation in part of U.S. application Ser. No. 08/131,473, filed Oct. 4, 1993, now U.S. Pat. No. 5,427,580 entitled "Phased Chain Assemblies," the subject matter of which is incorporated herein by reference, which is a continuation in part of U.S. application Ser. No. 07/885,194, filed May 19, 1992, now abandoned, the subject matter of which is also incorporated herein by reference.

BACKGROUND OF THE INVENTION

The present invention relates generally to power transmission chains. The invention has particular application to power transmission chains of the inverted tooth or silent chain variety, which are used in engine timing applications as well as in the transfer of power from a torque converter to a transmission or in a transfer case of a four-wheel drive vehicle. The invention also has applications with roller chains and chain-belts for continuously variable transmissions (CVT).

Conventional silent chains utilize links with inverted teeth for the transmission of power. Sets or rows of inverted tooth links are interleaved and connected by pins to form the chain assembly. Typically, guide links are press fit on the pins and are included along the outsides of both sides of the link rows to maintain the chain on the sprockets. The pins typically extend out beyond the edges of the guide links in the transverse direction of the chain, i.e., the direction transverse to the longitudinal movement of the chain around the sprockets.

As explained below, in one embodiment of the present invention, the pins are flush with the outside edges or sides of the outside links or guide links, or are constructed for minimal projection from the sides of the outside links. Minimization of the projection of the pins allows a narrower chain construction and permits embodiments where the guide links of the two chains in side-by-side relation may also be in touching relation.

The present invention has particular application to chain assemblies in which the chains and sprockets are offset, or phased, to modify the impact noise spectrum and chordal action noise spectrum. In a phased chain system, a single chain assembly is divided into, or replaced by, two side-by-side chains that are phased or offset by one-half pitch. In one embodiment of the present invention, the minimal pin projection is utilized on the sides of the two chains that are in the side-by-side relationship. The guide links with the minimal pin projection are placed in a groove in the center between the phased sprockets. With the guide links in the center groove, the guide links on the opposite or outer sides of the chains may be eliminated. Elimination of the guide links on one side of the chain, and running the guides links from the two chains in the center groove in a side-by-side and touching relationship, allows the achievement of a narrower phased chain system than in certain phased chain systems of the prior art.

As previously mentioned, silent chains are typically formed of interleaved sets of inverted tooth links. A set or rank of links is assembled from several links positioned alongside of or adjacent to each other. The links are connected by pivot members or pins, which are typically round pins or rocker joint pins received in a pair of apertures. An example of silent chain is found in U.S. Pat. No. 4,342,560, which is incorporated herein by reference.

Conventional silent chains typically include both guide links and inverted tooth links. The guide links are positioned on the outside edges of alternate sets of links. The guide links typically act only to position the chain laterally on the sprocket. Guide links do not mesh with the sprocket.

The inverted tooth links, or sprocket engaging links, provide the transfer of power between the chain and sprocket. Each inverted tooth link includes a pair of apertures and a single depending tooth or a pair of depending toes or teeth. Each toe is defined by an inside flank and an outside flank. The inside flanks are joined at a crotch. The inverted tooth links are designed so that the links contact the sprocket teeth to transfer power between the chain assembly and the sprocket. The inverted tooth links, or driving links, contact the sprocket teeth along their inside link flanks or their outside link flanks or combinations of both flanks. The contacts between the links and the sprocket teeth can be of the type which provide a power transfer, or can be of the nature of an incidental contact, or can include root contact or side contact.

A conventional silent chain drive is comprised of an endless silent chain wrapped about at least two sprockets supported by shafts. Rotation of a driving sprocket causes power transmission through the chain and consequent movement of a driven sprocket. In an engine timing drive application, the driving sprocket is mounted on the engine crankshaft and the driven sprocket mounted on the camshaft. A chain for an engine timing drive application is shown in U.S. Pat. No. 4,758,210, which is incorporated herein by reference. Various types of engine timing systems and configurations are also shown in U.S. application Ser. No. 08/131,473, filed Oct. 4, 1993, which is incorporated herein by reference.

A second type of chain is known as "roller chain". A typical roller chain consists of alternate inner links and outer links. The inner links, which are also known as "bushing" links, consist of spaced sidebars with bushings tightly received in openings, or apertures, at each end of the sidebars. The outer links, which are also known as "pin" links, consist of spaced sidebars with pins tightly received in openings, or apertures, at each end of the sidebars. The bushings freely rotate about the pins to pivotally connect the outer links to the inner links in alternate arrangement. Rollers are provided on the bushings, and when the roller chain is wrapped about a sprocket, the teeth of the sprocket are received between the laterally spaced sidebars and the longitudinally spaced rollers. An example of roller chain is found in U.S. Pat. No. 4,186,617, which is incorporated herein by reference.

Roller chain drives can include both "true roller" and rollerless design. The true roller design includes the described rollers mounted about the bushings. Rollerless chain contains bushings that directly contact the sprocket. Both types of roller chain are typically specified in industry as British Standard chain and American National Standards Institute (ANSI) chain.

Noise is associated with chain drives. Noise is generated by a variety of sources, but in silent and roller chain drives it can be caused, in part, by the impact sound generated by the collision of the chain and the sprocket at the onset of meshing. The loudness of the impact sound is affected by, among other things, the impact velocity between the chain and the sprocket and the mass of chain links contacting the sprocket at a particular moment or time increment.

Many efforts have been made to decrease the overall noise level and pitch frequency noise distribution in chain drives of the silent chain variety to minimize the objectionable effects of the pure sonic tones. Several of those efforts are discussed in the above-mentioned U.S. application Ser. No. 08/131,473, filed Oct. 4, 1993. The present invention finds application along with some of the noise reduction concepts discussed in the above-mentioned application, including randomization and phasing of the chain assemblies. However, the present invention has broader applications to chain systems that include, for example, non-phased sprockets or non-randomization of link profiles.

Phasing the chain and sprocket relationship can reduce the number of chain link teeth (or mass) impacting the sprocket during a given time increment. Similarly, phasing the chain and sprocket relationship can alter or phase the chordal action or articulation of the chain and sprocket. The chain randomization and sprocket phasing modifications can alter the impact and chordal action generated sound patterns.

However, in the narrow chain assembly package requirements that are particularly found in modern engine timing systems, the use of a phased chain system can be difficult in that the single chain is often replaced by two chains that are placed in side-by-side and phased relation. The need to place two phased chains in side-by-side relationship in the same width previously occupied by a single chain requires elimination of inside links or use of thinner inside links. (The term "inside link" or "inner link" is used to describe an articulating link, or link that articulates with respect to the pins, with teeth constructed to drive the sprocket, in contrast to conventional "guide links" that are press fit and act to maintain the chain on the sprocket.) Such a modification is disadvantageous in that it requires fewer inner links across the width of the chain, or thinner inner links across the chain, which generally result in a weaker chain assembly than the assembly with a greater number of inner links across the width of the chain.

Modern engine timing systems often have as few as four links in the non-guide row and four or five links in the guide row. (The term "guide row" refers to the rows or sets of links along the length of the chain that include guide links on the outsides, while the term "non-guide row" refers to the rows along the length of the chain that are interleaved with the guide rows and do not include guide links on the outside.) In order to package such a narrow timing system in a phased system in approximately the same width, without decreasing the link thickness, the chain system often requires the use of chains laced with as few as two links in the guide row and two links in the non-guide row, i.e., what is referred to as a "2×2 lacing."

Silent chains typically utilize two conventional guide links, i.e., guide links without inverted teeth that are designed to contact the sprocket and provide a driving force, in each guide row. In a 2×2 lacing, such a construction results in every guide row, i.e., every other row of the chain, not having a driving contact with the sprocket. Such a construction that fails to provide a driving or power transmission contact with the sprocket in every row can result in a noisier chain than a chain in which every row has a driving contact with the sprocket.

Moreover, phased chain systems as well as side-by-side non-phased chain systems, are conventionally constructed with the two chains in a spaced-apart relationship. The spacing is provided between the two chains to assure that the chains do not contact one another during operation. In high speed automotive applications, significant movement occurs in the portions of each chain that span the longitudinal space between the driving and driven sprockets of each assembly. The separation between the two chains in the transverse direction is provided to prevent any contact between the two chains during such movement. Clearances between the chain and other structures are typically recommended in order to avoid contact from longitudinal or transverse movement of the chain during operation. The separation distance between the chains also contributes to the size or overall width of the chain package.

The present invention is directed to overcoming such disadvantages. The present invention provides other advantages in decreasing the width of the package size of the phased chains or allowing more inner links in a chain of the same width as without the present invention.

SUMMARY OF THE INVENTION

The present invention relates to a chain assembly in which the pins are placed in the chain assembly with minimal projection beyond the outside links of the chain. That is, the pins are preferably flush or do not project beyond the edge of the outside links on at least one side in the transverse direction of the chain. To the extent the pins extend beyond the outside links, the extension is preferably limited to less than 50% of the thickness of the outside or outermost link, or more preferably, less than 10% of the thickness of the outside or outermost link.

In one embodiment of the present invention, a phased chain system includes two chains in side-by-side but offset or phased relation. The projection of the pins is limited on the sides of the two chains that are in side-by-side relationship. The minimal projection of the pins may allow the guide links of the chains to be in a touching relationship.

In one embodiment, the present invention provides a slot in the center of, or between the two, phased sprockets. The guide links travel in this slot in the center of the sprockets. As a result of the pins being flush against the links, or projecting only a minimal distance beyond the outside edges of the links, the two side-by-side chain assemblies may be placed close together and the guide links of the two chains are in contact with each other. By close placement of the two chains, the overall system achieves a narrower width. Moreover, the guide links on the opposite sides of each chain may be eliminated as the slot in the center of the sprockets provides a guiding function with the single guide links.

The pins are placed flush with the outside link by driving the pins in a direction toward the center of the chain. Alternatively, the aperture may be slightly relieved on the outside of the chain so that the pin may seat in the aperture. The pin may be placed asymmetrically with respect to the transverse direction of the chain so that the pin extends a greater amount from one side of the chain than from the other side of the chain.

The pin need not be flush with the outside of the link, but should preferably not extend very far outward in the transverse direction of the chain. In one embodiment the projection of the pin is limited to less than 50% of the thickness of the innermost link. (The term "innermost link" is used to define the link on the side of the chain that, for example, is in side-by-side relation with an adjacent chain. In non-phased system, or in systems without side-by-side chains, either side of the chain may be defined as the "inner" side that includes an "innermost link.") In a more preferred embodiment, the projection of the pin is limited to less than 10% of the thickness of the innermost link.

In certain embodiments of the present invention, the guide link is in the form of an inverted inside link. That is, the guide link resembles an upside down inside link with a crotch between two upward extending portions. Such guide links, with additional features, are shown, for example, in U.S. application Ser. No. 08/196,310, filed Feb. 19, 1994, entitled "Chain Guide Link," to David White, U.S. Pat. No. 5,445,570 the disclosure of which is incorporated herein by reference. The guide link is thinner than the inside links, or driving links, and is located on the inside or innermost position of the chain. The outside or outermost link of the chain is also thinner than the inside or driving links. In contrast to the inside links, which are fit for articulation with respect to the pins, the outside or outermost link is press fit on the pins. The outermost link may include inverted teeth or may resemble the innermost guide link. The inside links are preferably conventional inside links with pairs of inverted teeth for drivingly contacting the sprocket teeth. (The terms "outermost link" and "innermost link" are used to define a link in a particular row of links, and may define similar links in other rows of links.)

The present invention provides several advantages in decreasing the width of the chain assembly. In the small package sizes necessary for modern automotive engine timing chains, the elimination of the spacing between the two chains in the phased chain system provides such a package size advantage. Moreover, the use of the center groove for placement of the guide links allows elimination of guide links on the opposite side of the chain, which also contributes to a smaller package size for the chain. In addition to allowing a chain of lesser width, the present invention allows a pair of chains of greater numbers of driving or inverted tooth inside links to fit in the same width of a pair of chains without the guide links of the present invention.

The present invention also provides a novel form of guiding the two chains in a side-by-side relationship. In conventional chain systems, the two side-by-side chains are placed in a spaced apart relationship, with specified clearances, in order to avoid any contact between the two chains from longitudinal or transverse movements of the chain. In the present invention, the two chains are placed in a contacting or touching relationship so that each chain will guide the other chain. Such an approach is contrary to the conventional teachings of avoiding contact.

The present invention has particular application with phased chain assemblies or systems. That is, high speed automotive transmission, transfer case or engine timing systems in which the sprockets are split into two portions or separate assemblies and the sprocket portions are offset or phased with respect to one another, with single or multiple chains.

Each of these embodiments, as well as certain other embodiments, may include a plurality of chain assemblies, including assemblies of two, three, or four chain strands. Additionally, the sprockets may be phased ¼, ⅓ or ½ tooth, as well as various other amounts of pitch. Likewise, the chain assemblies may be phased by ¼, ⅓ or ½ pitch, or other amounts of pitch.

In each chain assembly, the links are interleaved to form sets of links. Each link includes a pair of apertures, with an aperture from one set of links being aligned for interlacing with an aperture from an adjacent set of links. Pivot members, in the form of round pins or rocker joints, are utilized to connect the adjacent sets of links through the apertures, and to allow pivoting of the sets of links with adjacent sets. In the case of silent chains, the driving links have inverted teeth for providing a power transmission with the sprocket. In the case of roller chains, the links are interconnected and the sprocket is contacted by either rollers or bushings.

The present invention also provides advantages in the modular construction of chain. In conventional chain assemblies for automotive applications, chains can be provided in widths of, for example, 0.750 inch, 0.875 inch and 1.00 inch. In providing chains for these widths, an additional link is added to each row. Thus, the 0.875 inch wide chain has one additional link in each row than the 0.750 inch wide chain and the 1.00 inch wide chain has one additional link in each row than the 0.875 inch chain. In other words, each guide row of 0.875 inch chain includes one more link than each corresponding guide row of 0.750 inch chain and each non-guide row of 0.875 inch chain includes one more link than each corresponding non-guide row of 0.750 inch chain.

In the present invention, modular chains are provided in two standard widths. The width of the three conventional standard chains can be met with various combinations of the two modular chains of one width; two chains of the second width; or, a chain of one width in combination with a chain of the second width. In providing phased systems for these chains, the use of modular chains in various combinations avoids the need for manufacture of an additional chain. Modular chains provide manufacturing savings and advantages in the preparation of phased chain assemblies for customers.

BRIEF DESCRIPTION OF THE DRAWINGS

For a more complete understanding of the invention, one should refer to the embodiments illustrated in greater detail in the accompanying drawings and described below by way of examples of the invention. In the drawings, which are not to scale:

FIGS. 10 A–B are illustrations of the present invention with a timing chain system having a single camshaft and crankshaft;

FIG. 11 is an illustration of the present invention with a timing chain system having a pair of overhead camshafts;

DETAILED DESCRIPTION OF THE PREFERRED EMBODIMENTS

Figure 1:
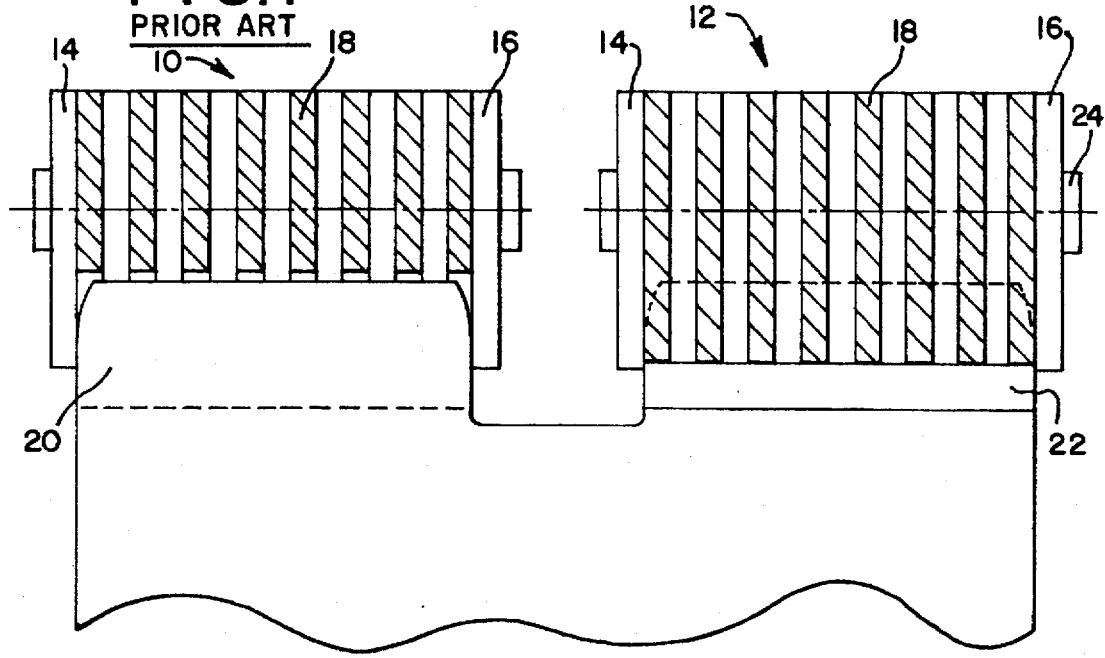
FIG. 1 is a schematic illustration showing a portion of two phased chains of the prior art in side-by-side relation.

As illustrated in the drawings, the present invention is directed to providing a chain with pins set for minimal projection in the transverse direction of the chain. FIG. 1 illustrates a pair of phased chains 10, 12 of the prior art in a side-by-side relationship. The two chains include guide links 14, 16 along their outsides and inside or articulating links 18 that have pairs of depending toes for driving contact with the sprockets. The two sprockets 20, 22 are phased or offset by approximately one-half pitch.

As typical of the prior art, the pins 24 project outward from the sides of the chain assembly at both sides of the chain. The pins are generally symmetric (within manufacturing tolerances) with respect to the transverse direction of the chain. The two chains 10, 12 shown in FIG. 1 are in a separate and spaced apart relationship. The spacing is provided to prevent contact of the guide links of one chain with the guide links of the adjacent chain. However, some chains of the prior art allow contact between the projecting pins of the two chains. Examples of such a prior art phased chain assembly are shown in Japanese unexamined utility model application publication No. 5-17251 (application No. 3-90363) and Japanese unexamined utility model application publication No. 3-28348 (application no. 1-51389). These applications depict incidental contact between pins of adjacent chains.

Figure 2:
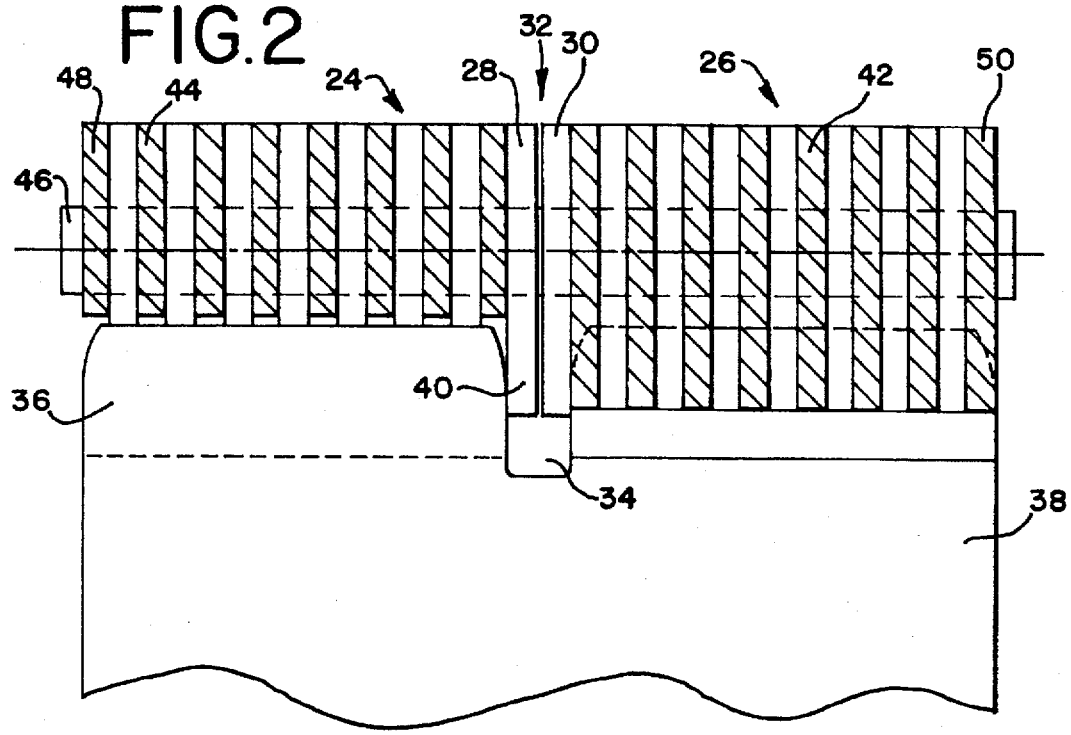
FIGS. 2, 2A and 2B are schematic illustrations showing a portion of two phased chains in embodiments of the present invention in side-by-side relation.
Figure 2A:
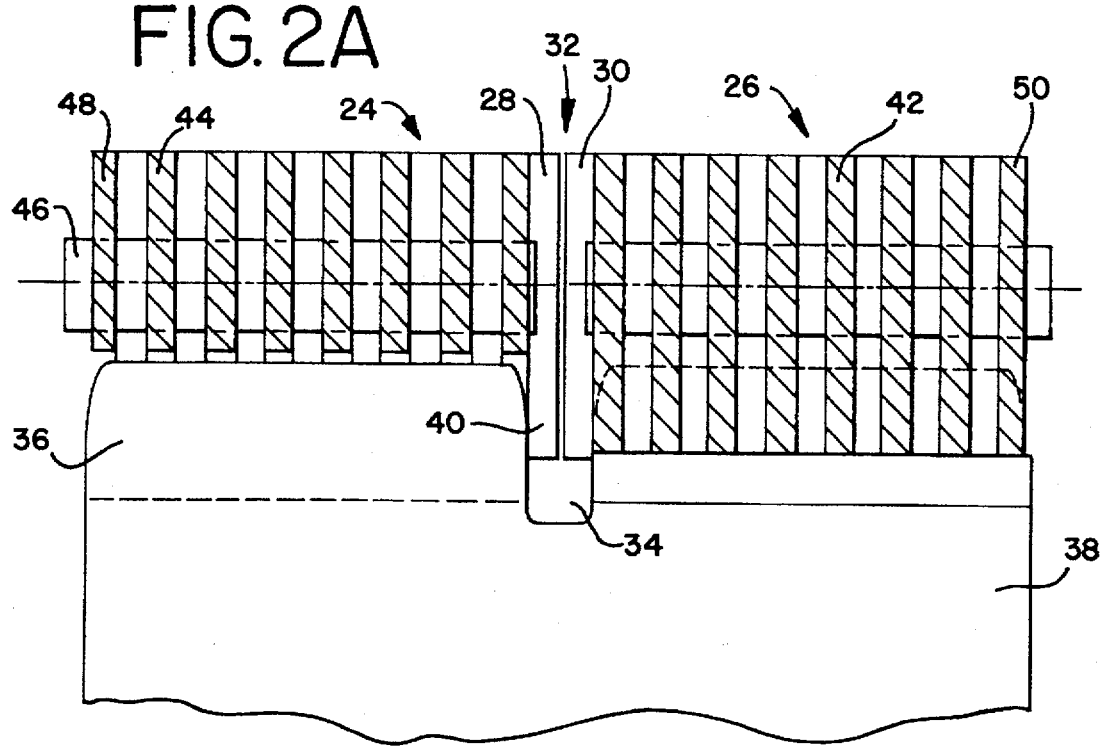
Figure 2B:
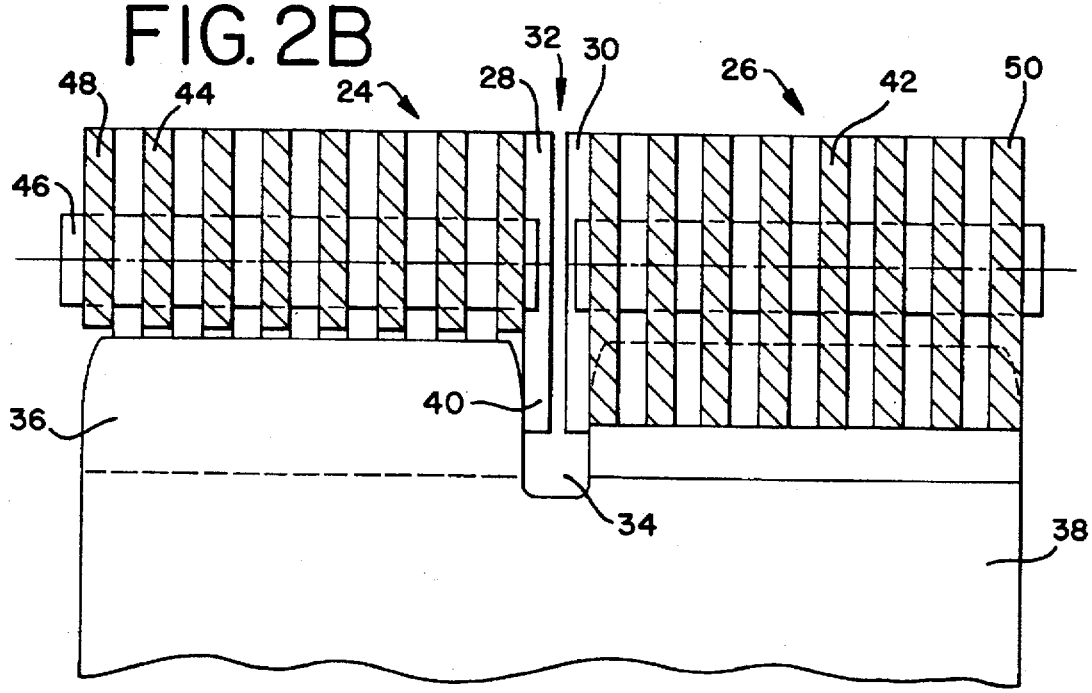

FIG. 2 illustrates a pair of phased chains 24, 26 that utilize the minimal pin projection feature of the present invention. As seen in FIG. 2, the two chains include guide links 28, 30 that are located along the inside of the chains, that is, the parts of the two chains that are in the side-by-side relationship, shown generally at 32. In this embodiment, the pins do not project beyond the edges of the innermost guide links 28, 30. Accordingly, the two guide links are in a touching relationship as they travel about the sprocket. The guide links are also held within the groove 34 between the two sprocket portions 36, 38. The placement of the lower portion 40 of the guide links in the groove 34 maintains the chains on the sprockets. In this manner, the chains are able to guide each other by the contact between the guide links of the adjacent chains. In one embodiment, the guide links 28, 30 are thinner than the inside or driving contact links 42, 44.

The "edge" of the guide link is the flat surface on the side of the link in the transverse direction of the chain. The distance between the two edges is the thickness of the link. The thickness is shown, for example, in the sectional view of FIG. 2. The pins 46 are allowed to project beyond the outside edges of the outermost links 48, 50. However, in one embodiment, the outermost links 48, 50 are thinner than the inside or driving contact links 42, 44. The pins are press fit into the outside links in conventional fashion. The outside links have inverted teeth for power transmission contact with the sprockets.

Figure 8:
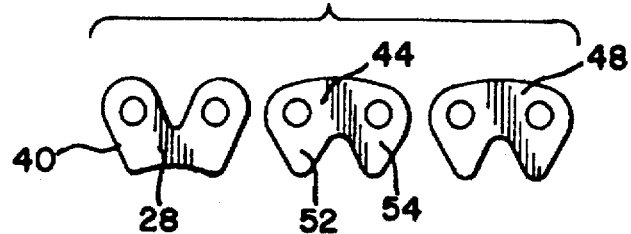
FIG. 8 is a side view illustrating the three types of links of one embodiment of the present invention, including the innermost guide link, the conventional inside link and the outer link.
Figure 9:
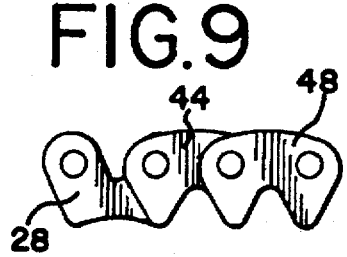
FIG. 9 is a side view illustrating the interleaving of the links of FIG. 8.

The guide links 28, inside links 44 and outside links 48 of one chain assembly 24, are shown in more detail in FIGS. 8 and 9. The innermost link 28 is a guide link that has a lower extending portion 40 that maintains the chain on the sprocket. The inside link 44 is a conventional articulating link with two depending teeth 52, 54 for driving contact with the sprocket. The outside link 48, or outermost link, is an inverted tooth link. The pin is preferably press fit on the outermost link. Other combinations of links are also possible. For example, the guide link 40 may be an inverted tooth link. Similarly, the outside link 48 may also be an inverted tooth link. Alternatively, the outside link may be a traditional guide link. While only one inside link 44 is shown in FIGS. 8 and 9, additional inside links may be interleaved to obtain a 2×2 or other lacing configuration. Lacings with additional inside links are shown, for example, in FIGS. 3–6.

The fit of the pins 46 into the inside guide links 28 to achieve minimal pin projection is accomplished in any of a number of possible manners. Three methods of manufacture are illustrated in FIGS. 12, 13 and 14. Of course, other methods of manufacture are possible and the invention is not limited to the methods illustrated and described here.

Figure 12A:
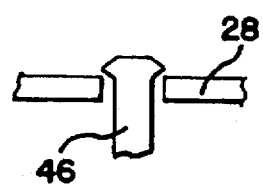
FIG. 12 is a schematic illustration of a method of manufacture of the present invention in which the pin is driven from the position in FIG. 12A to the position in FIG. 12B where it is substantially flush with the outside edge of the link.
Figure 12B:
Figure 13:
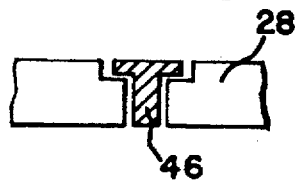
FIG. 13 is a schematic illustration of a method of manufacture of the present invention in which the pin is set in a recess in the aperture of the link.

In the method illustrated in FIG. 12, the pin is driven through the link until it extends outside the guide link 28, as shown in FIG. 12A. After the head of the pin is riveted, then the pin is driven back into the guide link to the point where the desired projection is achieved, as shown in FIG. 12B. The pin head may extend beyond the end of the link, but preferably is substantially flush or possibly recessed into the link. The pin may be driven back into a recess in the aperture of the link, or may cause the link itself to plastically deform. In one embodiment, the pin extends out from the surface of the link by less than 10% of the thickness of the link. In another embodiment, the pin extends out from the surface of the link by less than 50% of the thickness of the link. While other amounts of projection are possible, the intent of the invention is to limit the projection of the pins in order to promote the advantages of the invention, which include, for example, the decrease in chain width.

When the pin is set in the link, the pin may be asymmetrically located with respect to the transverse direction of the chain. That is, the pin projects more to one side of the chain than to the other side across the width of the chain assembly.

A second method of manufacture is illustrated in FIG. 13. In that method, the pin is driven into a recess in the aperture in the link. The recess is sufficient to allow the maintenance of the above-described desired relationships of pin projection from the edge of the link.

Figure 14A:
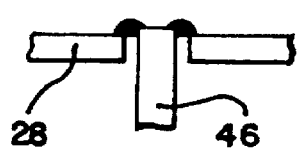
FIG. 14A is a schematic illustration of a welded pin in the prior art and FIG. 14B is a schematic illustration of a method of manufacture of the present invention in which the pin is welded in a recessed position in the aperture.
Figure 14B:
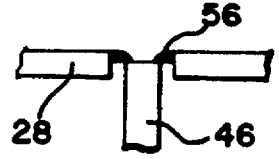
Figure 15:
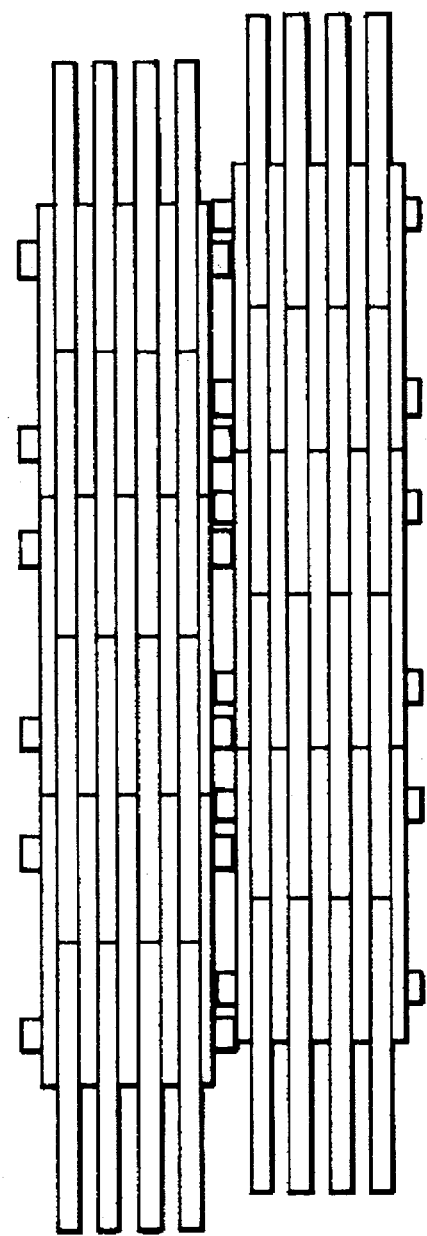
FIG. 15 is an illustration of a top view of a portion of a pair of phased chains having the pins extending beyond the guide links and contacting the guide links of the adjacent chain.

A third method of manufacture is illustrated in FIG. 14. In that method, the pin is recessed in the aperture and a weld 56 is placed over the pin to maintain its position in the link. As shown in FIG. 14A, welding is used in conventional links of the prior art to maintain the pin in the link, but the weld also projects outward from the link. In the present invention, as shown in FIG. 14B, the weld is located in the recess between the top of the pin and the outside edge of the link and thus the projection of the weld beyond the outside edge of the link is minimized. Other means of bonding or securing the pin, such as chemical treatments, are also contemplated by the present invention.

The present invention finds particular application with modular chain assemblies. However, it must be emphasized that the modular chain assemblies described herein are not limited to use with minimal pin projection or the other aspects of the present invention and, accordingly, have much broader applications to both phased and non-phased chain systems.

Figure 3:
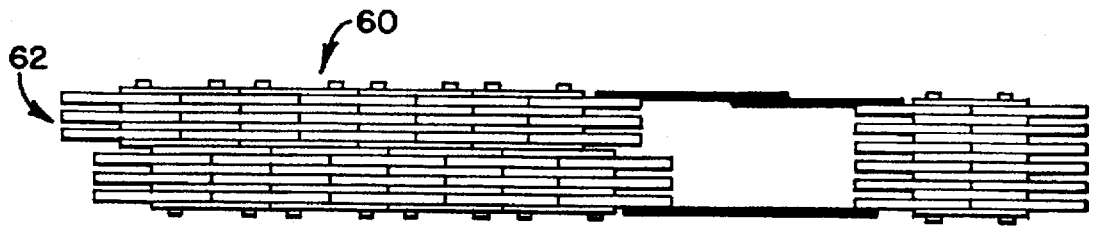
FIG. 3 is a top view illustration of a portion of a pair of modular chains of a first width having the minimal pin projection feature of the present invention.
Figure 4:
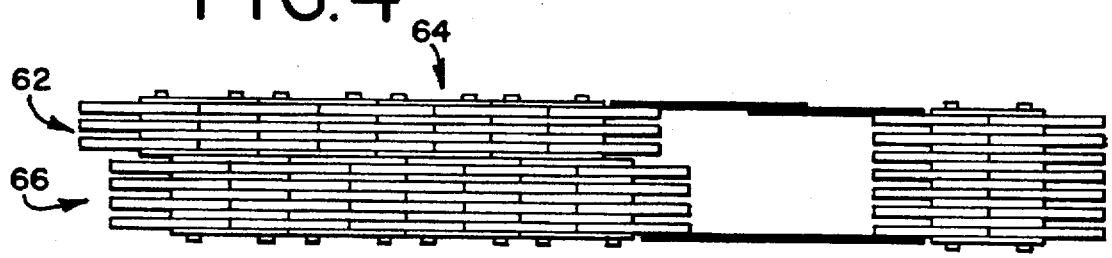
FIG. 4 is a top view illustration of a portion of a pair of modular chains of a first and a second width having the minimal pin projection feature of the present invention.
Figure 5:
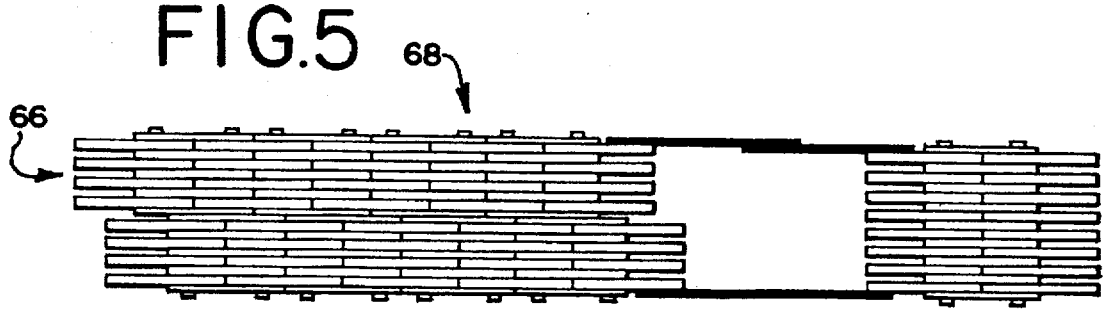
FIG. 5 is a top view illustration of a portion of a pair of modular chains of a second width having the minimal pin projection feature of the present invention.

Examples of modular chain systems of the present invention are shown in FIGS. 3, 4, and 5. The modular systems are built on the principle of the combination of two chains to provide a phased system. In a non-phased system, modular chain systems are used to construct a chain system of a specified width from two or more chains of lesser width.

In the prior art construction of chain systems, and particularly phased systems, the two or more chains of the system were typically of the same width. Thus, two chains of X/2 width were typically combined to provide a chain system of X width, where X is the number of links across a given guide row in the chain, whether or not the system was phased. The two chains that together comprise the prior art systems are typically of equal width. Equal width chains are used in the prior art in order to assure equal load distributions across the width of the entire chain assembly.

As a result, the assembly of a wider system requires two chains to achieve a width of (X+1) links. For example, standard chain system assemblies are 0.750 inch, 0.875 inch and 1.00 inch. Assembly of each of these widths adds one additional link to each guide row. (Similarly, one additional link is added to each non-guide row.) Assembly of the next standard width requires two chains that achieve a width of (X+2) links. Accordingly, assembly of chain systems of three standard widths requires assembly of chain systems of three different widths (X, X+1, X+2).

In constructing these systems with two chains, the chains need to be of widths of X/2 or ½(X+1) or ½(X+2) number of links in the guide row. Thus, three different length chains were required to manufacture the three standard chain systems.

The modular chain systems of the present invention overcome these disadvantages by making the chains that form the system of different widths. Thus, the two chains that form the combined system are of two different widths that, when combined in a system, make a chain of the desired width.

In the present invention, two modular chains are formed of width A, which equals X/2 number of links in the guide row, and width B, which equals ½(X+2) number of links in the guide row. These two modular chains, A and B, are used in lieu of the three chains described above (X, X+1, X+2). These two modular chains, A and B, provide the correct number of links to achieve the combined systems of the chains using equal width chains of widths X, X+1, or X+2.

The modular chains are shown in FIGS. 3, 4 and 5 to achieve the standard systems of 0.750 inch, 0.875 inch, and 1.00 inch. In FIG. 3, the 0.750 inch chain 60 is formed by combining two chains 62 of width A. In FIG. 4, the 0.875 inch chain 64, which requires an additional link in each guide row and each non-guide row, is formed by combining a chain 62 of width A with a chain 66 of width B. In FIG. 5, the 1.00 inch chain 68, which requires yet one more additional link in each guide row and each non-guide row, is formed by combining two chains 66 of width B. In this manner, the three standard chain systems are constructed using two modular chains of widths A and B in lieu of three equal width chains.

Using the formula described above, the three chains of widths of 6 links (FIG. 3), 7 links (FIG. 4) and eight links (FIG. 5), in the non-guide row, are formed of two modular chains of 3 links (width A) and 4 links (width B), instead of three chain widths.

Substantial savings in manufacturing can be realized by the use of the above-described modular chain systems. The use of the modular systems reduces manufacture, assembly and inventory of chains by approximately one third by needing only two modular chains, where previously three chains were necessary. The modular chain systems of the present invention may be applied to non-phased systems as well as phased systems. Similarly, the modular chain systems may be applied to any standard chain systems which are constructed by adding one additional link to the width of the chain. The present invention is not limited to the standard sizes that are presented above as examples.

Figure 6:
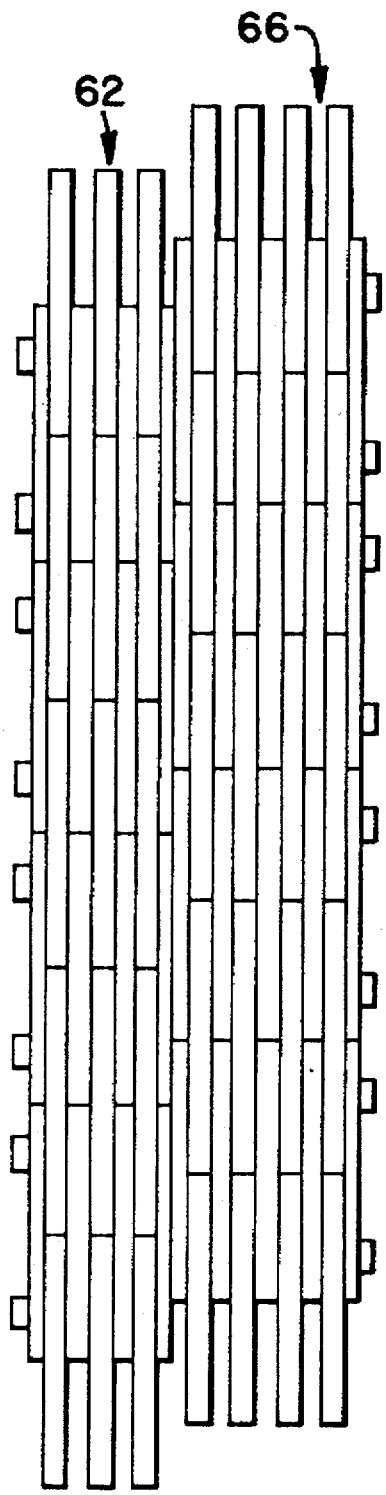
FIG. 6 is an illustration of a top view of a portion of a pair of phased chains having the minimal pin projection feature of the present invention.
Figure 7:
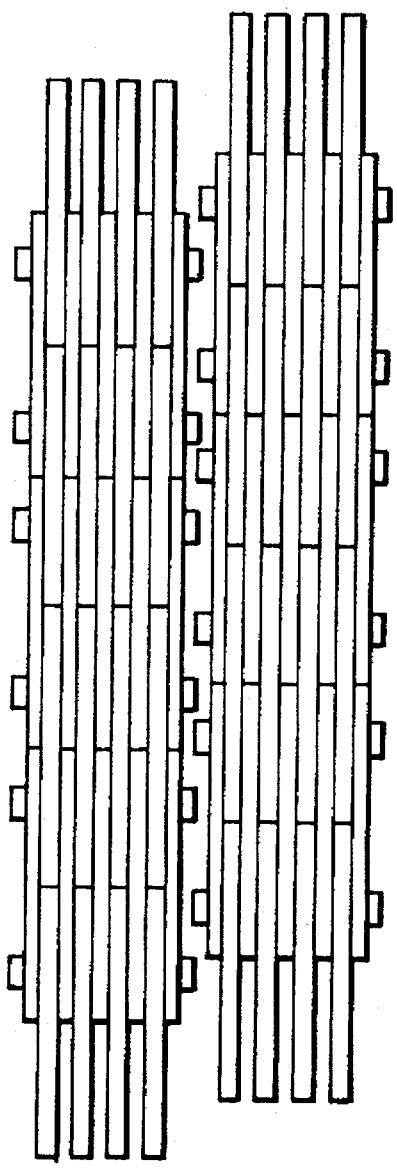
FIG. 7 is an illustration of a top view of a portion of a pair of phased chains of the prior art.

The modular systems of the present invention may also be used with the minimum pin projection features of the present invention, as demonstrated in FIG. 6. The modular chains 62, 66 of widths A and B are combined in FIG. 6 with the minimum or zero pin projection feature. The reduction in the width of the chain is shown in comparison in FIG. 7 (not to scale), which shows the prior art version of the same chain system with two chains of equal width and pins projecting from both sides of the chains of the system.

Thus, the minimal pin projection feature of the present invention allows two chains of a system to be placed in a narrower width package by placing the chains in closer side-by-side proximity. In one embodiment, the guide links of the two side-by-side chains are allowed to contact one another during operation of the chain system. Alternatively, the minimal pin projection feature of the present invention allows placement of a chain with a greater number of links across the chain in the same width package as the prior art chain. By placing the two chains in closer proximity, a greater number of links can be placed across the chain. A greater number of links across the width of the chain typically provides a chain of greater strength than a chain of fewer number of links placed across the width of the chain.

The features of the present invention find application most prominently in the high speed chain applications for automotive engine timing and transfer case or transmission chains. Examples are shown in FIGS. 10 and 11 of use in engine timing chain systems with a single camshaft and with two overhead camshafts. Other timing systems applications are possible with various timing systems configurations such as those shown in application Ser. No. 08/131,473, filed Oct. 4, 1993.

FIGS. 10 and 11 illustrate two configurations of phased timing systems. In FIG. 10, the engine timing system 200 includes one driving sprocket system 202 located on the crankshaft 203 and one driven sprocket system 204 located on the camshaft 205. Rotation of the crankshaft causes rotation of the camshaft through the chain 206 and sprocket system. The crankshaft sprocket 202 has one-half the number of teeth of the camshaft 204 sprocket. The camshaft typically controls the valve train operation through hydraulic lifters and rocker arms connected to the valve stems.

In order to implement the phased system, the crankshaft sprocket and camshaft sprocket are each replaced by pairs of sprockets 208, 210 that are offset by one-half pitch. Two side-by-side chains 212, 214 are placed on the sprockets in the phased relationship.

In the embodiment illustrated in FIG. 11, the engine timing system utilizes a crankshaft 216 connected to two overhead camshafts 218, 220 by a pair of chain systems, 222, 224. If only the crankshaft sprockets are phased, then two offset sprockets are placed on crankshaft in a phased relationship. Each chain 222, 224 is connected to a single sprocket 228, 230 on each of the two overhead camshafts. If the camshaft sprockets are also phased, then two offset sprockets are placed on each overhead camshaft in a phased relationship. Four sprockets are then used on the crankshaft.

Four chains connect the four sprockets on the crankshaft with the two sprockets on each camshaft. Two of the crankshaft sprockets 232, 234 can be phased by one half pitch with the other two crankshaft sprockets, or all four sprockets can be phased by one quarter pitch. The chain systems include tensioners 236, 238 on the slack side of each chain to maintain chain tension and snubbers 240, 242 on the tight side of each chain to control chain movement during operation.

The features of the present invention also find application in other chain applications, such as those with rocker joint apertures and CVT transmission chains.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A silent chain and sprocket assembly, comprising:

first and second chains, each of said chains having a plurality of interleaved sets of links, said chains being in side-by-side relationship around sets of sprockets, each chain having an inner portion that is located closest to the other chain and an outer portion located on the opposite side of said chain from said inner portion, each chain having pivot members connecting adjacent sets of links, each link having a pair of apertures for receiving said pivot members, each chain having some of said sets of links including inside links, each of said inside links having at least one depending tooth adapted to contact the teeth of a sprocket, said inside links being constructed to permit articulation of said inside links with respect to said pivot members, each of said chains having some of said sets of links with at least one guide link at said inner portion of said chain and an outer link at an outer portion of said chain, said guide links having said pivot members extending through at least a portion of said apertures of said guide links, said first chain being of a first width extending from said first chain inner portion to said first chain outer portion, said second chain assembly being of a second width extending from said second chain inner portion to said second chain outer portion, said first width being different from said second width.

2. The chain and sprocket assembly of claim 1 wherein said chain and sprocket assembly further comprises:

first and second driving sprockets connected to a driving shaft, said first and second driving sprockets having a plurality of spaced teeth, said driving sprockets being disposed in parallel relationship along said drive shaft, the location of said teeth of said first driving sprocket being circumferentially offset with respect to the teeth of said second driving sprocket, first and second driven sprockets connected to a driven shaft, said first and second driven sprockets having a plurality of spaced teeth, said driven sprockets being disposed in parallel relationship along said driven shaft, the location of said teeth of said first driven sprocket being circumferentially offset with respect to the teeth of said second driven sprocket, said drive shaft being operatively connected to a power input and said driven shaft being operatively connected to a power output, said first driving sprocket being aligned with said first driven sprocket and having said first chain drivingly connecting said first driving sprocket with said first driven sprocket, said second driving sprocket being aligned with said second driven sprocket and having a second chain drivingly connecting said second driving sprocket with said driven sprocket.

* * * * *